(12) United States Patent
Savitski et al.

(10) Patent No.: US 6,596,122 B1
(45) Date of Patent: Jul. 22, 2003

(54) SIMULTANEOUS BUTT AND LAP JOINTS

(75) Inventors: Alexander Savitski, Liberty Township, Delaware County, OH (US); Robert A. Grimm, Columbus, OH (US)

(73) Assignee: Edison Welding Institute, Inc., Columbus, OH (US)

( * ) Notice: Subject to any disclaimer, the term of this patent is extended or adjusted under 35 U.S.C. 154(b) by 0 days.

(21) Appl. No.: 09/720,698

(22) PCT Filed: Jul. 9, 1999

(86) PCT No.: PCT/US99/15467

§ 371 (c)(1),
(2), (4) Date: Dec. 29, 2000

(87) PCT Pub. No.: WO00/02723

PCT Pub. Date: Jan. 20, 2000

Related U.S. Application Data
(60) Provisional application No. 60/092,396, filed on Jul. 10, 1998.

(51) Int. Cl.⁷ .............................................. B29C 65/00
(52) U.S. Cl. ................ 156/304.2; 156/272.2; 156/272.8; 156/304.3; 156/158
(58) Field of Search ................ 156/272.2, 272.8, 156/275.5, 293, 294, 304.2, 304.6, 304.3, 158, 379.8, 380.9, 503; 285/369, 370, 417, 423

(56) References Cited

U.S. PATENT DOCUMENTS

| | | | |
|---|---|---|---|
| 2,739,829 A | 3/1956 | Pedlow et al. ............. 285/115 |
| 3,560,291 A | 2/1971 | Foglia et al. ............... 156/272 |
| 3,972,548 A | * 8/1976 | Roseen ...................... 156/158 |
| 4,156,626 A | 5/1979 | Souder ....................... 156/272 |
| 4,783,099 A | 11/1988 | Muser ........................... 285/7 |
| 5,160,559 A | * 11/1992 | Scovil et al. ............ 156/303.1 |
| 5,480,196 A | * 1/1996 | Adams, Jr. ................. 285/347 |
| 5,500,054 A | * 3/1996 | Goldstein .................. 136/246 |
| 5,740,314 A | 4/1998 | Grimm ........................ 392/420 |
| 5,840,147 A | * 11/1998 | Grimm ..................... 156/272.2 |
| 5,843,265 A | 12/1998 | Grimm ........................ 156/272 |
| 5,893,959 A | 4/1999 | Muellich .................. 156/272.8 |
| 5,943,474 A | * 8/1999 | Lovett ..................... 156/272.2 |

FOREIGN PATENT DOCUMENTS

| | | |
|---|---|---|
| DE | 33 12 464 A1 | 10/1984 |
| GB | 2 286 147 A | 8/1995 |
| JP | 10-281383 A | 10/1998 |

OTHER PUBLICATIONS

UK Patent Application GB 2286147 A Sep. 1995 Dickinson, Alan.*
Patent Abstracts of Japan, vol. 1999, No. 1, Jan. 29, 1999, Abstract of JP 10 281383 A (NKK Corp.).
Supplementary European Search Report, May 21, 2002 of Counterpart EP Application No. EP 99 93 3793 including patent family members.

* cited by examiner

*Primary Examiner*—Michael W. Ball
*Assistant Examiner*—John L. Goff
(74) *Attorney, Agent, or Firm*—Gallagher & Dawsey LPA; David J. Dawsey; Michael J. Gallagher

(57) ABSTRACT

A method for production of simultaneous lap and butt joints directs electromagnetic radiation (12) through a radiation transmitting material (40) to an absorbing material (44a, 44b, and 44c) that absorbs radiation (12) with the generation of heat. The heat provides sufficient molten material in interfaces (50a, 50b, and 50c) to fuse and bond: 1) pipe ends (14, 24) to each other in a butt joint (22), 2) pipe end portion (16) to sleeve (40) in a lap joint (28a), and 3) pipe end portion (26) to sleeve (40) in a lap joint (28b). Use of a sufficiently clear material for sleeve (40) allows visual inspection of joints (22, 28a, and 28b). Butt joint (22) can be formed by conductive heating without absorbing material (44a) to provide a smooth interior bore useful for transporting high purity fluids without risk of absorbent contamination or debris and organism collection in gaps found in previous joining techniques.

33 Claims, 6 Drawing Sheets

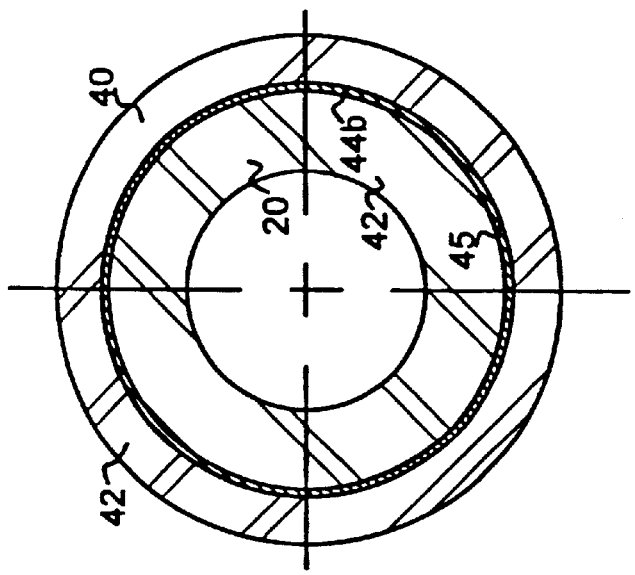
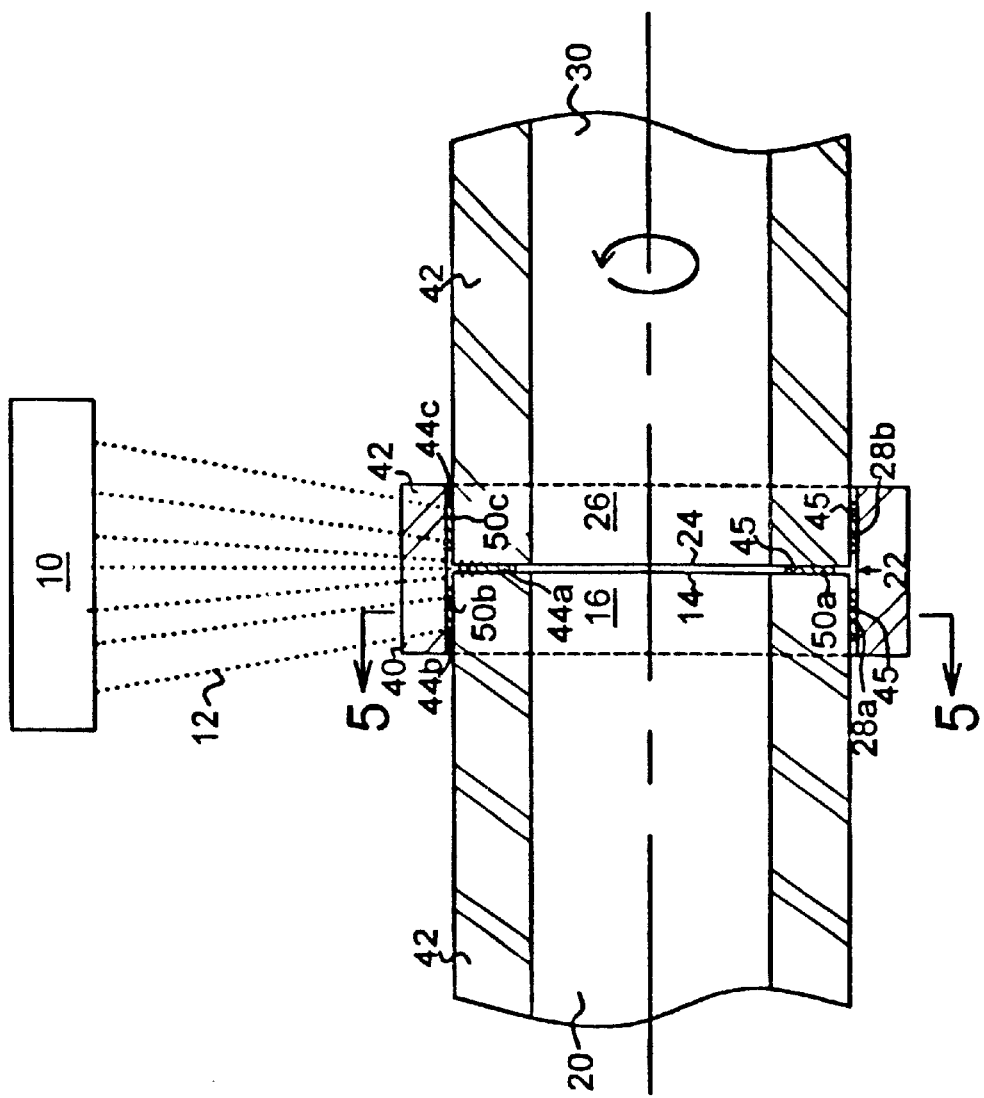

SIMULTANEOUS BUTT AND LAP JOINTS

CROSS REFERENCE TO RELATED APPLICATION

This application is the United States national stage of PCT Application PCT/US99/15467 filed on Jul. 9, 1999 (published as WO 00/02723 on Jan. 20, 2000) which claims the benefit of U.S. Provisional Application No. 60/092,396 filed on Jul. 10, 1998 all of which are incorporated by reference as if completely written herein.

BACKGROUND OF THE INVENTION

1. Field

This invention relates to a method for joining plastic materials. More particularly, it relates to the bonding of materials by passing electromagnetic radiation through one or more transmitting plastic materials and into a radiation absorbing material with the generation of heat and resulting fusion of components to simultaneously form both lap and butt joints.

2. Background

Although one piece items are preferred because of their strength and exclusion of assembly operations, mechanical limitations and other considerations often make it necessary to join plastic materials to each other or to other parts. As a consequence, a number of methods for joining plastic materials have been developed. The use of mechanical fasteners is labor intensive, the plastic is corrupted by fastener holes resulting in mechanical joints that often leak, and the joints are weak. Press and snap fits are also used but this is often unsatisfactory since high stress components are unacceptable when the materials are subject to thermal cycling or to harsh environments.

In thermal welding, one or more of the plastic parts to be joined are placed close to or in contact with a heat source such as a hot plate or other appropriately shaped hot element device to melt the plastic at which time the parts are then pressed together to form the welded joint. Induction welding uses a material that is susceptible to heating in an induction field that is implanted within the thermoplastic matrix. Application of an induction field causes the implanted material to heat and melt the surrounding plastic material which, if in contact with the part to be joined, forms the requisite joint.

In vibration welding, one of the parts is held stationary and the other is vibrated to produce frictional heat. Alignment is critical and bonds may not be as strong as expected. In spin or friction welding, one part is held stationary while the other is rotated under sufficient pressure to keep the parts in contact with each other. The heat melts the surface at which point pressure is applied to complete the bonding process. In both vibration and spin welding, high forces are needed to generate the frictional heat to melt polymers like polyethylene and, as such, heavy and costly equipment is needed to provide substantial clamping force.

Solvents and adhesives have also been used to join thermoplastic materials. However, some solvents can adversely effect some plastics. Also, solvents present potential hazards to assembly personnel. Plastics can be bonded with a variety of adhesives but often these are solvent based and present the solvent problems noted above. In addition, adhesives can complicate polymer recycling. Both solvent and adhesive methods are complicated by waste and chemical disposal problems in addition to surface preparation requirements. Solvent and adhesive methods are typically used with polyvinyl chloride (PVC) piping.

Infrared lamps and laser beams have been used to bond one plastic to another but such techniques have been limited to single joint applications. Laser welding has additional problems. Bond strengths can be disappointing. Vaporization and flashing (ignition) of substrate can occur when gaps occur between the interface of the two materials. Laser welding also tends to create surface pits and craters. Although lasers have been on the market for a considerable time, their cost is still relatively high.

None of these methods have proven satisfactory for the joining of tubular parts such as plastic pipe. Although the following two methods of joining plastic pipe are widely used, nether of them is entirely satisfactory. In butt welding, the ends of the pipes are joined by bringing the ends of the pipes close to or in contact with a hot plate. After sufficient melting has occurred, the hot plate is removed and the ends pressed together and cooled under pressure. A good butt weld does not leave any gaps in the interface between the two pipes that are joined. Exterior weld defects can be readily determined by visual inspection and, if necessary, the joint rejected and rejoined. However, it is to be noted that a flash or weld bead is formed on both the interior and exterior of the pipe joint. The interior weld bead is disruptive of smooth flow within the pipe and leaves an uneven surface on the exterior of the pipe. Butt welds are typically used with straight runs of pipe that can be well supported to prevent failure of the joint. Butt welds are not typically used with small pipe fittings as the bulk heating can result in considerable distortion of the fittings, especially when thin-wall fittings and pipe are used.

In lap welding, an additional fitting, referred to as a coupling or collar, is slipped over the end portions of the pipes and joined to the exterior pipe surface by melting the interior surface of the coupling and/or the exterior surface of the pipe or by using a solvent or adhesive. Heating is the common method of pipe lap joint welding with adhesives or solvents being using with only a small amount of piping such as PVC pipe. Although hot element type heating can be used, implanted resistive element heating is preferred as it allows better control of the melting process. Lap joint tends to be strong because the fitting overlaps the end portions of both pipes and considerable surface area on both pipes is involved in the joint. However, the joint cannot be visually inspected and failure to evenly apply solvent, adhesive, or heat to the coupling and/or radial surface portions of the pipe can leave undetected weak joints. The ability to visually inspect lap joints has been a long felt need in all industries using plastic pipe. Visual observation would reveal the amount of fusion of the collar and pipe in the joint and thereby provide a strong indication of the soundness of the joint as well as revealing defects such as bubbles caused by overheating and decomposition of the plastic pipe or the failure to adequately melt the plastic. Another problem with the lap joint is that it leaves an open interface, i.e., gaps, between the ends of the joined pipes. Such gaps are regions of potential accumulation of microbes and foreign debris that can be quite detrimental in industries using plastic pipe for transportation of fluids such as high purity water and other liquids including semiconductor, food, pharmaceutical and chemical solutions. The use of resistive heating elements imbedded in the plastic matrix of the joint components further accentuates the contamination problem when the element melts through the plastic during the joining process and later comes in contact with the passing fluid.

It is therefore, an object of this invention to make a doubly secure and strong joint It is on object of this invention to provide a joint with no gaps or defects in the butt weld interface.

It is on object of this invention to provide a joint with no gaps or defects in the lap joint weld interface.

It is an object of this invention to provide a butt joint without a weld bead on the interior of a pipe.

It is another object of this invention to make simultaneously both a butt and lap joint.

It is another object of this invention to provide for visual inspection of a lap joint.

It is an object of the present invention to heat only those portions of a joint involved in bonding while leaving other portions of the materials essentially unaffected, undistorted, and in their initial (pre-bonding) configuration.

It is a further object of the present invention to avoid the use of solvents and other environmentally unfriendly bonding adhesives.

It is an object of the present invention to avoid contamination from electrically resistive heating elements.

It is an object of the present invention to provide a uniform and strong bond along the bond line.

Other objects of the invention will become apparent to those with ordinary skill in the art from consideration of the present disclosure.

SUMMARY OF THE INVENTION

To meet these objects, a joining method of the present invention features a method for the simultaneous formation of both butt and lap joints. The method comprises the steps of:

1) Providing a radiation source of electromagnetic radiation in the form of poly-chromatic, non-coherent radiation such as from a quartz-halogen lamp or stimulated, monochromatic, coherent radiation from a laser source.
2) Providing work pieces in a butt joint configuration, that is, the end of a first piece is butted against the end of a second piece to form a butt joint relation defining a first interface.
3) Placing a sleeve over the end portions of the first and second pieces to form lap joint configurations. The end portion of the first piece forms a lap joint relation with the sleeve and defines a second interface. The end portion of the second piece forms a second lap joint with the sleeve and defines a third interface. The edge of the butt joint is sandwiched between the first and second lap joints.
4) Providing at least a portion of one of the pieces as a substantially rigid radiation transmitting material, that is, the end portion of the first piece, the end portion of the second piece, or the lap joint piece (sleeve) must be a radiation transmitting material.
5) Providing an absorbing material that absorbs the electromagnetic radiation with the generation of heat. The absorbing material is placed in at least a portion of a bond line formed by the first interface, the second interface, and the third interface. However, it is possible to omit the absorbing material from one of the interfaces and rely on conductive heating of that interface. The quantity of heat produced by the absorption of the radiation must be sufficient to bond: a) the ends of the first and second pieces with a butt joint, b) the end portion of the first piece to the sleeve with a lap joint, and c) the end portion of the second piece to the sleeve with a second lap joint.
6) After the above arrangement of the first and second work pieces and the sleeve have been made along with the proper selection and arrangement of transmitting and absorbing materials, the electromagnetic radiation from a radiation source is passed initially through a transmitting plastic and then to the absorbing material. It is noted that a wide variety of combinations and arrangements of transmitting and absorbing materials can be made. For example, the absorbing material can be provided as an integral part of one of the components, that is, the first piece, the second piece, or the sleeve. The absorbing material can be provided as a separate component that is placed in one or more of the three interfaces. The absorbing material can be selected from a wide range of materials with carbon black having been found to provide good radiation absorption even in small quantities of less than a fraction of a percent. Emulsions of carbon black and other colored pigments that can be readily painted onto the interface materials have been shown to be a good source of absorbing material. The absorbing material can be combined with a filler material, preferably a material similar in composition to the work pieces or the sleeve. In such a case, the absorbing and filler material combination can be a thin film of black plastic such as found in electrical-type tapes or thin film sheet material. If transmitting materials are selected that are sufficiently clear, visual inspection of the resulting joints can be made after the joining process is complete.
7) Sufficient electromagnetic radiation is then absorbed by the absorbing material to produce enough heat in the bond line to provide sufficient molten material to afford fusion of the ends and end portions of the first and second pieces and the lap joint sleeve.
8) The bond line is then cooled to bond the ends of the first and second piece in a butt joint, the end portions of the first and second pieces and the sleeve in lap joints.

The method is particularly effective for joining plastic pipe with simultaneous butt and lap joints. One of the features of the invention is the omission of absorbing material in the interface between the ends of the pipe forming the butt joint. By relying on conductive heating from absorbing material in the lap joint interfaces, it is possible to obtain a good butt joint between the ends of the pipe. In addition, the joint is smooth and gap free about the internal pipe bore. This has the advantage of eliminating the possibility of absorbing materials contaminating the fluids flowing in the pipe and also eliminating any gaps where debris and living organisms may accumulate. Such a feature is especially important in those industries where the purity of fluids flowing within in the pipes must be maintained at high levels.

For pipe joints, the coupling sleeve can be provided on the outside of the pipes or placed within the bore of the pipes. When on the exterior of the pipes, a sleeve may make it difficult to pass the pipe through small openings. When on the interior of the pipe, the sleeve partially obstructs fluid flow and renders the flow more turbulent. To avoid such difficulties, a recess can be formed in the end portion of each of the pipes to accept and accommodate the sleeve. A recessed circular surface and a radial ledge define the recess in the end portion of each pipe. When the ends of the pipe are placed in butt relation, the two recesses accept the coupling in mating relation.

The ends of the coupling form a butt joint relation with each of the radial ledges in the end portions of the pipe. These butt joint relations give rise to a fourth and fifth interface of the bond line. Absorbing material is typically provided in these interfaces. The recesses may be formed on either the exterior or interior of the pipe. When the recesses are on the interior of the pipe, a coupling filled with absorbing material eliminates the need for applying absorbing material to the various interfaces and provides a convenient, low cost source of absorbing material.

The foregoing and other objects, features and advantages of the invention will become apparent from the following disclosure in which one or more preferred embodiments of the invention are described in detail and illustrated in the accompanying drawings. It is contemplated that variations in procedures, structural features and arrangement of components may appear to those skilled in the art without departing from the scope of or sacrificing any of the advantages of the invention.

BRIEF DESCRIPTION OF THE DRAWINGS

FIG. 4. is a cross-sectional view showing a simultaneous butt and lap joint arrangement for joining two pieces of plastic pipe with a sleeve in which separate portions of absorbing material are placed in the lap joint interfaces and the butt joint interface.

FIG. 5 is a cross-section view taken along line 5—5 of FIG. 4 further illustrating the position of absorbing material sandwiched between the outer radial surface of one of the pipe pieces and the inner radial surface of the lap joint sleeve piece.

Figure 1:
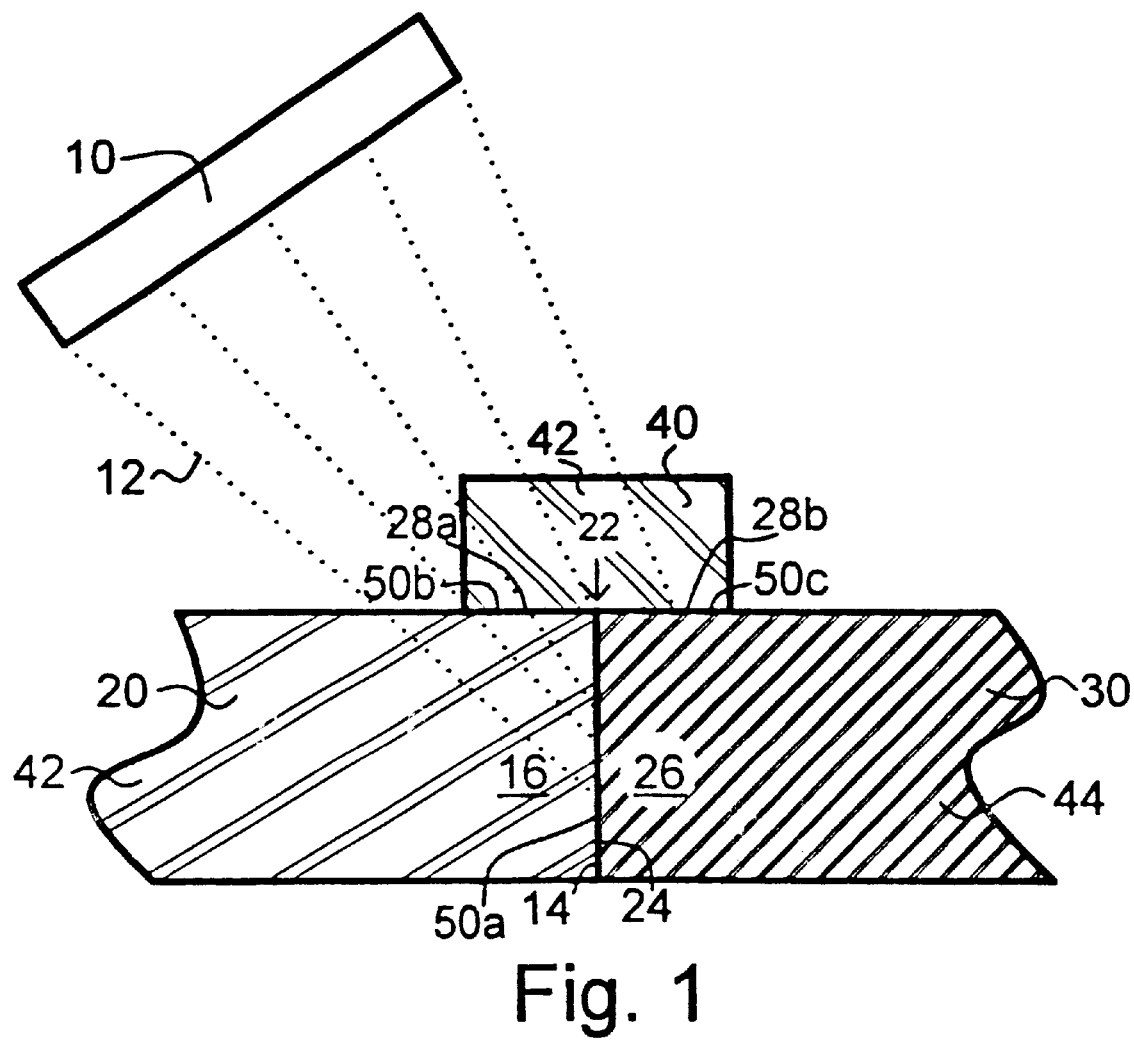
FIG. 1. is a cross-sectional view showing a general simultaneous butt and lap joint arrangement according to the present invention in which only one component of the arrangement contains radiation absorbing material.

In describing the preferred embodiments of the invention which are illustrated in the drawings, specific terminology is resorted to for the sake of clarity. However, it is not intended that the invention be limited to the specific terms and materials so selected and it is to be understood that each specific term includes all technical equivalents that operate in a similar manner to accomplish a similar purpose.

Although preferred embodiments of the invention have been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

Figure 3:
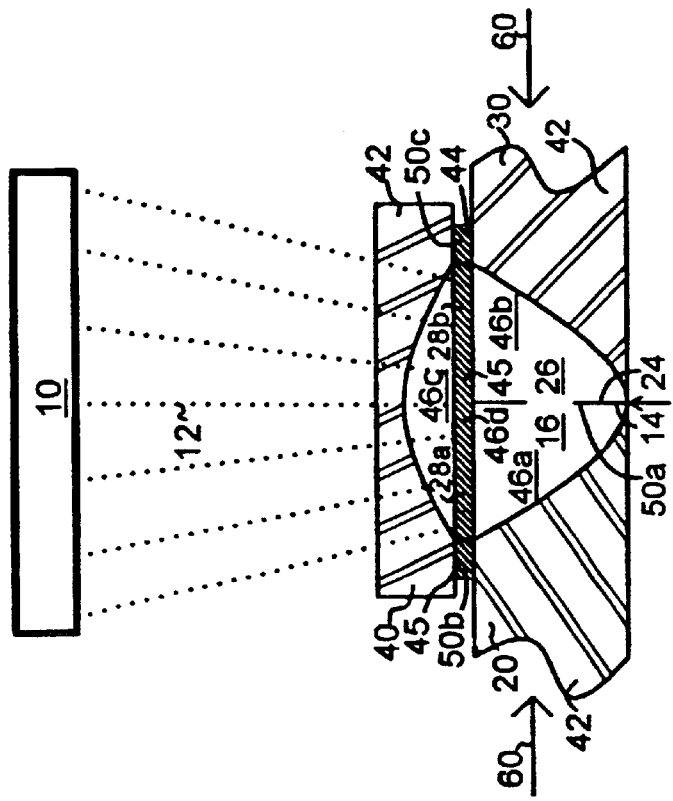
FIG. 3. is a cross-sectional view showing a general simultaneous butt and lap joint arrangement in which a separate absorbing material is placed in the lap joint interfaces with radiation absorption producing sufficient heat to conductively melt the plastic of the components at the butt joint interface.
Figure 2:
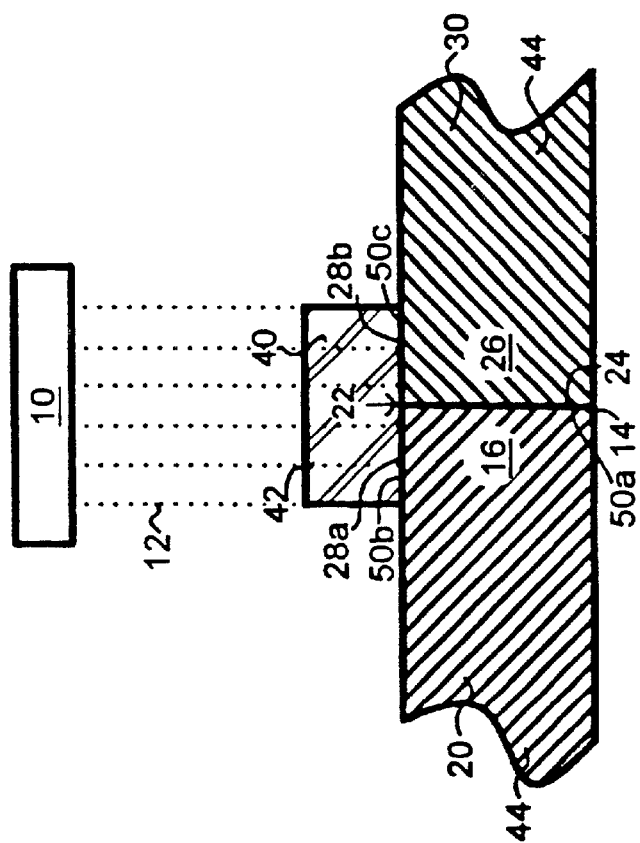
FIG. 2. is a cross-sectional view showing a general simultaneous butt and lap joint arrangement in which only one component is a radiation transmitting material.
Figure 6:
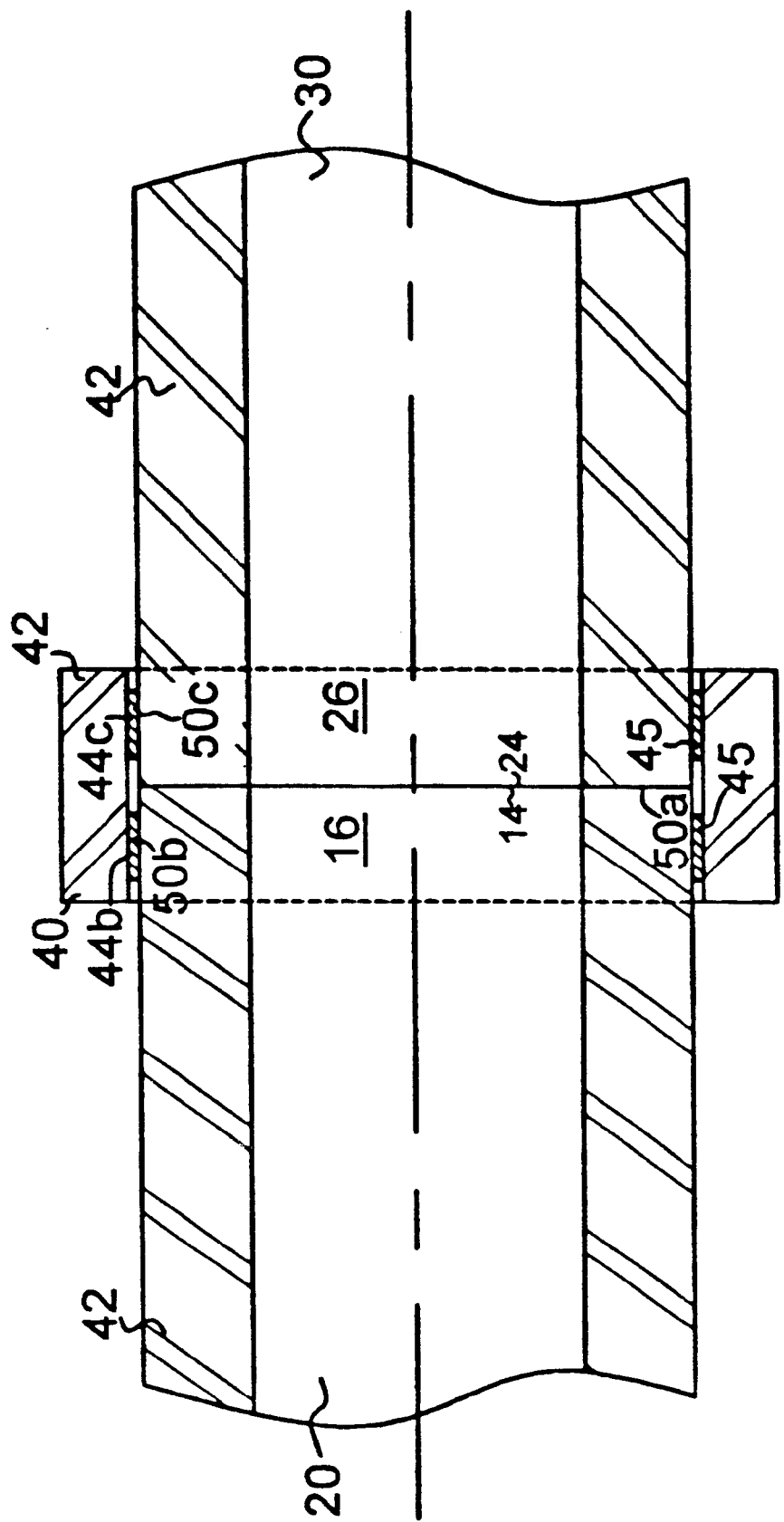
FIG. 6. is a cross-sectional view showing a simultaneous butt and lap joint arrangement for joining two pieces of plastic pipe with a sleeve in which a single piece of absorbing material is placed in the lap joint interfaces with radiation absorption producing sufficient heat to conductively melt the plastic of the ends of the plastic pipe at the butt joint interface.

With reference to the drawings and initially FIGS. 1–3, the present invention is a method for the simultaneous formation of a butt and lap joint. The invention comprises the steps of providing a butt joint configuration 22 and lap joint configurations 28a, 28b, providing a source 10 for passing electromagnetic radiation 12 through a substantially rigid radiation transmitting material 42 to an absorbing material 44 that absorbs the radiation 12 with generation of sufficient heat to provide molten material 46a–c (FIG. 3) to afford fusion and on cooling bonding of components 20, 30 and 40 in both a butt joint configuration 22 and lap joint configurations 28a, 28b.

A wide variety of radiation sources 10 may be used with this invention including infrared lamps such as quartz-halogen and quartz-tungsten lamps, lasers such as carbon dioxide, yttrium aluminum garnet (YAG), neodymium glass, ruby, helium neon, krytpon, argon, hydrogen and nitrogen lasers, and super-emitting photon generators based on super-emissive material such as neodymium, yttrium, ytterbium, holmium, erbium, thulium, cerium, thorium, and other materials that emit radiation by an inner electron shell transition. Such sources may be configured in a variety of ways to provide a number of radiation patterns. Elliptical reflectors, parabolic reflectors, line and strip heaters, focused lasers, and light pipe configurations provide various radiation configurations for use with this invention. U.S. Pat. Nos. 5,840,147, 5,740,314 and 5,500,054, all of which are incorporated herein by reference and additional references cited therein provide further details of some of the various types and configurations of radiation sources that can be used with the present invention. Radiant energy, in the form of polychromatic, non-coherent electromagnetic radiation from spontaneous emission sources such as quartz-halogen lamps are presently preferred because of their relative low cost. Stimulated emission sources, i.e., laser sources, can also be used with the present invention.

Low cost radiant energy sources produce radiant energy in the range from the ultraviolet to the far infrared, typically about 0.25 microns ($\mu$) to about 8 microns Preferably an energy source in the range of $0.5\mu$ to $2.8\mu$ is used with a radiation source providing peak near-infrared energy in the range of about $0.7\mu$ to about $1.5\mu$ being most preferred for many applications. Infrared radiation from filament sources produces a distribution of wavelengths with the wavelength of maximum emission being a direct function of source temperature (FIG. 5). Wien's Law, i.e., $\lambda_{max}(\mu)=$ 2989$\mu$ ° K. /T(° K.), governs such behavior. Thus an incandescent source operating at 3000° C. (3273° K.) shows maximum output at a wavelength of 0.89$\mu$.

As shown in FIGS. 1–3, a butt joint relation 22 is provided by placing the end 14 of a first component piece 20 close to or in contact with an end 24 of a second component piece 30. Lap joint relations 28a, 28b are formed by placing a lap joint piece 40 close to or in contact with the end portion 16 of the first component piece 20 and the end portion 26 of the second component piece as well as the butt joint relation 22 of the abutting ends 14, 24 of the first and second component pieces 20, 30. Typically the lap joint piece covers most if not all of the outer edge of the butt joint configuration. That is, the lap joint edge is sandwiched between 1) the lap joint relation 28a of the end portion 16 of the first piece 20 with the lap joint piece 40 and 2) the lap joint relation 28b of the end portion 26 with the lap joint piece 40 and is also covered by the lap joint piece 40. The lap joint piece 40 is typically a sleeve (alternately referred to here as a ring, collar, or coupling) whose inner surface conforms closely to the outer surfaces of the end portions 16, 26 of first and second pieces 20, 30, respectively. The collar or sleeve 40 may open for ease of placement over the end portions 16 and 26 but a closed collar or sleeve is preferred with the collar or sleeve 40 placed over one of the first or second pieces 20 or 30. The first and second pieces 20, 30 are then brought into butt joint relation with each other and the collar 40 slipped back to cover the end portion 16 or 26 of the other piece 20 or 30, respectively. First and second pieces 20 and 30 can have a wide variety of shapes and can be hollow or solid. These pieces can be round pipes or conduits with a variety of polyhedral cross sections or equivalent solids of similar shape.

At least one of the pieces 20, 30 and 40 or a portion thereof must be provided as a substantially rigid transmitting plastic material that transmits electromagnetic radiation 12. In FIG. 1, piece 20 and lap joint piece 40 are of transmitting material 42. In FIG. 2, only the lap joint piece 40 is a transmitting material 42 while in FIG. 3, all three components 20, 30, and 40 are transmitting materials 42

The present invention contemplates a wide range of transmitting materials 42 including organic and inorganic substances and polymers and plastics including both thermoset and thermoplastic materials. Transmitting plastics include, but are not limited to, acrylics, ultraviolet (UV) grade acrylics, polystyrenes (PS), polycarbonates (PC), methylmethacrylates, styrene-acrylonitriles, polyolefins, nylons, fluoropolymers such as polyvinylidene fluoride (PVDF), methylpentenes, epoxies, silicones, and urethanes. Such plastics may be colored, clear or opaque. However the coloring pigments must not absorb appreciable quantities of the electromagnetic radiation 12 used for the joining process. Although not required, preferably the transmitting material should be sufficiently clear to afford visual inspection of the underlying bond.

An absorbing material 44 that absorbs the electromagnetic radiation 12 with generation of heat is provided in or near at least a portion of a bond line that comprises 1) a first interface 50a between the end 14 of the first piece 20 and the end 24 of the second piece 30, 2) a second interface 50b between the exterior of end portion 16 of the first piece 20 and interior of the lap joint piece 40, and 3) a third interface 50c between said end portion 26 of said second piece 30 and the lap joint piece 40. The absorption of electromagnetic radiation 12 must generate sufficient heat to 1) bond the end 14 of the first piece 20 to the end 24 of the second piece 30 in a butt joint configuration 22, 2) bond the end portion 16 of the first piece 20 to the lap joint piece 40 in a lap joint configuration 28a, and 3) bond the end portion 26 of the second piece 30 to the lap joint piece 40 in a lap joint configuration 28b.

A wide variety of radiation absorbing materials 44 are contemplated by the present invention including inorganic materials such as, but not limited to, pigments, fillers, fibers and reinforcing materials. Carbon blacks have been found to be a particularly good absorber for radiant electromagnetic radiation with amounts of less than 1% being effective for the present invention. As shown in FIGS. 1–3 absorbing material 44 can be placed into the bond line interface as a separate component (FIG. 3) or it can be mixed and formed as an integral part of one or more of the pieces to be joined (FIGS. 1–2). In FIG. 1, the absorbing material is provided as an integral part of second piece 30. In FIG. 2, the absorbing material is provided as an integral part of first piece 20 and second piece 30. In FIG. 3, the absorbing material is provided as a separate component 44. When, as shown in FIG. 3, the absorbing material is provided as a separate component, it must be sufficiently thin (less than a few millimeters) to assure bonding of the three components 20, 30, and 40. The absorbing material can also be provided as a carbon black or other absorbing pigment suspensions or emulsions similar to that found in water-based paints and marking pens.

When used as a separate component, the absorber may be mixed with a suitable bonding material that facilitates and promotes the bonding of the three components 20, 30, and 40 in a lap and butt weld configuration. For example, the absorbing material may be provided as a thin film of black plastic a few mils (10–250 micro meters) thick. Preferably the filler material 45 is of the same composition as the components that provide molten material for component fusion and bonding. For effective bonding, it is preferred that the absorbing material be in proximity with the three components 20, 30 and 40. As used here, the term "proximity" is used to mean "close to" or "in contact with." However, it is to be noted that the absorbing material need not be placed in or near the totality of the bond line formed by all three interfaces, i.e., 1) interface 50a of the butt joint relation 22 between the ends 14 and 24 of pieces 20 and 30, respectively, 2) interface 50b of the lap joint relation 28a between the end portion 16 of piece 20 and the lap joint piece 40, and 3) interface 50c of the lap joint relation 28b between the end portion 26 of piece 30 and the lap joint piece 40. As will be illustrated, conductive heating by the absorbing material and resulting molten materials can be used to complete melting, fusion, and bonding in those regions of the bond line lacking absorbing materials. In certain arrangements, the absorbing material 44 can be completely omitted from a particular interface.

In FIG. 1, the absorbing material 44 is an integral part of second piece 30 while first piece 20 and lap joint piece 40 are both formed of transmitting material 42. Radiation 12 is directed initially through the transmitting material 42 of first piece 20 and lap joint piece 40 to the end 24 and end portion 26 of second piece 30 with generation of heat in interfaces 50a, 50b, and 50c sufficient to provide sufficient molten material to afford fusion of the end 14 of first piece 20, the end 24 of second piece 30, the end portion 16 of the first piece 20, the end portion 26 of the second piece 30 and the lap joint piece 40. The bond line comprised of first interface 50a, second interface 50b, and third interface 50c is cooled sufficiently to bond 1) the first end 14 of the first piece 20 with the second piece 30 in a butt joint configuration 22, 2)

the end portion 16 of the first piece 20 with the lap joint piece 40 in a lap joint configuration 28a, and 3) the end portion 26 of the third piece 30 with the lap joint piece 40 in a lap joint configurtion 28b.

It is to be noted that it is not necessary that all pieces 20, 30, and 40 supply molten material to form the bond. Thus in FIG. 1 the absorbing material 44 may not melt the second piece 30 because of its formation from a higher melting or non-melting material. However, absorption of radiation 10 by absorbing material 44 in second piece 30 provides sufficient heat to melt the end 14 of first piece 20 to provide sufficient molten material to fuse end 14 to end 24 and bond these two pieces to form butt joint 22 on cooling. Similarly sufficient heat is generated by the absorbing material in the end portion 26 of second piece 30 to melt the lap joint piece 40 along interface 50c so as to provide sufficient molten material to fuse end portion 26 to lap joint piece 40 and bond these two pieces to form lap joint 28b. Finally sufficient heat is generated by the absorbing material in end portion 26 to conductively heat and melt the lap joint piece 40 and end portion 16 along interface 50b so as to provide sufficient molten material to fuse end portion 16 to lap joint piece 40 and bond these two pieces to form lap joint 28a.

In a similar fashion, first piece 20 can be the non-melting piece with molten material for fusion in all three interfaces 50a, 50b, and 50c supplied by absorbing material second piece 30 and lap joint piece 40. Or lap joint piece 40 can be the non-melting piece with molten material for fusion in the three interfaces supplied by first piece 20 and absorbing second piece 30. Preferably all three pieces 20, 30, and 40 contribute molten material for fusion and bond formation of the butt joint 22 and lap joints 28a and 28b.

In FIG. 2, only the lap joint piece 40 is formed from transmitting material while both first piece 20 and second piece 30 are provided with radiation absorbing material 44 as integral units. In this arrangement, the lap joint piece 40 and at least one of the first piece 20 and second piece 30 can contribute molten material for fusion and bonding to produce butt joint 22 between ends 14 and 24, lap joint 28a between end portion 16 and lap piece 40, and lap joint 28b between end portion 26 and lap piece 40 while one of the first piece 20 and the second piece 30 is a non-melting piece. Alternatively, lap joint piece 30 can be the non-melting piece with both the first piece 20 and the second piece 30 providing molten material to the three interfaces 50a, 50b, and 50c to form the requisite butt joint 22 and lap joints 22a and 22b. Preferably all three pieces 20, 30, and 40 provide molten material for fusion and bond formation.

In FIG. 3, the absorbing material is provided separately as 44 in interface 50b between end portion 16 and lap piece 40 and in interface 50c between end portion 26 and lap piece 40. No absorbing material 44 is provided between butt joint ends 14 and 24. In this instance, sufficient heat is generated by the absorbing material 44 to melt conductively the ends 14 and 24 so as to provide sufficient molten material 46a, 46b to fuse and bond ends 14 and 24 in a butt joint configuration 22. The absorbing material 44 heats directly the end portions 16 and 26 and the lap joint piece 40 to provide sufficient molten material 46a, 46b, 46c to fuse and bond end portion 16 and lap joint piece 40 in a lap joint configuration 28a and end portion 26 and lap joint piece 40 in lap joint configuration 28b. When absorbing material 44 is provided with a filler material 45 of the same composition as the pieces providing the molten material, additional molten material 46d is provided to fuse and bond the various pieces. To facilitate the formation of the butt joint, pressure (designated by arrows 60) is applied to the first piece 20 and/or the second piece to further improve the fusion of the molten material forming the butt joint bond between ends 14 and 24.

FIGS. 4–10 are directed to various embodiments of the present invention useful for the joining of plastic pipe with simultaneous formation of butt and lap joints. Referring to FIGS. 4 and 5, a simultaneous lap and butt joint assembly is illustrated prior to the welding process. An infrared transparent ring (sleeve) 40 is slipped over end portion 16 of first pipe 20. A washer 44a containing absorbing material and filler 45 is placed against the end 14 of pipe 20 and the end 24 of second pipe 30 is butted up against washer 44a. That is, washer 44a is sandwiched between the ends 14, 24 of pipe 20 and pipe 30. A layer of absorbing film 44b is wrapped around the circumference of the end portion 16 of pipe 20 near, but not at its end 14. Similarly, an absorbing film 44c is wrapped around the end portion 26 of pipe 30 near, but not at its end 24.

Figure 10:
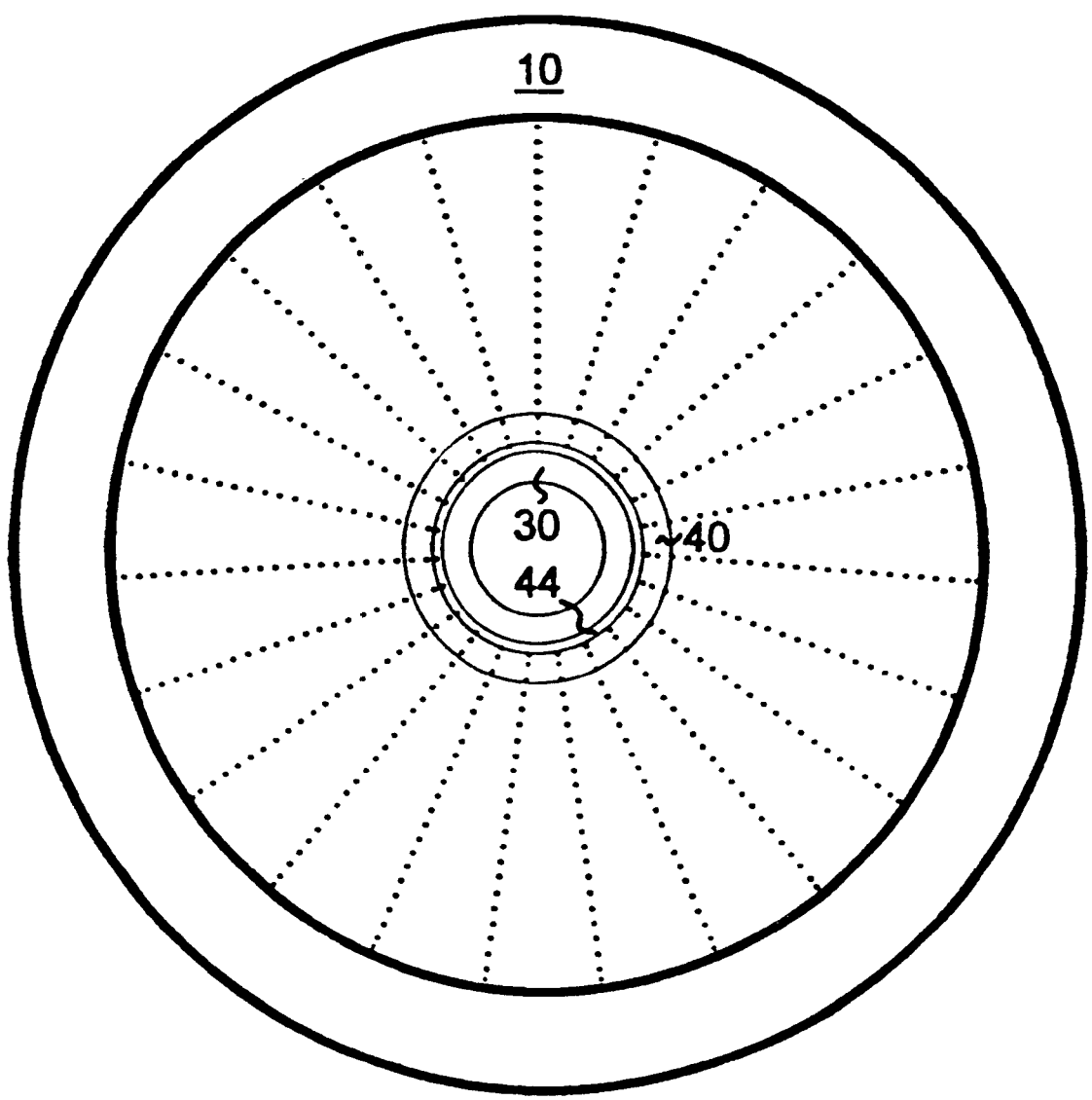
FIG. 10 is an end view illustrating a simultaneous butt and lap joint arrangement with a circular radiation source that completely circumscribes and heats the complete joint at one time.

Sleeve 40 is then slipped over absorbing materials 44b and 44c so as to be approximately centered over the butt joint 22 formed by pipe ends 14 and 24. The pipes are typically clamped in place to provided lateral pressure to urge ends 14 and 24 toward each other. Infrared radiation 12 from an infrared lamp 10 is focused onto the region of interfaces 50a, 50b, and 50c. Radiation passes through sleeve 40 and strikes absorbing materials 44b and 44c as well as absorbing material 44a causing heat to be generated at each of these locations which in turn causes the end portions 16 and 26 and ends 14 and 24 of pipes 20 and 30 and the interior of sleeve 40 to melt and fuse, simultaneously forming lap joints 28a, 28b between the end portion 16 of pipe 20 and sleeve 40, the end portion 26 of pipe 30 and sleeve 40 and a butt joint 22 between the ends 14 and 24 of pipes 20 and 30. The pipes 20 and 30 are then rotated under lamp 10 to completely weld the pipes with lap and butt joints around the circumference of pipes 20 and 30. Alternatively, lamp 10 may be mounted for rotation around the circumference of sleeve 40 or a circular lamp configuration such as shown in FIG. 10 may be used to complete the lap and bun welds around the pipe circumference without rotation of either the pipes or radiation source 10 and in a significantly reduced period of time.

As illustrated in FIG. 4, the absorbing materials 44a, 44b, and 44c do not extend to the edges of interfaces 50a, 50b, and 50c. Under such conditions, conductive heating extends beyond the absorbing materials 44a, 44b, and 44c and allows the molten plastic to fuse to itself and completely seal the absorbing material within a plastic shell. This tends to prevent contamination of fluids flowing within the pipes by the absorbing materials and ensures a good seal on the exterior of the joints. It is to be realized that when absorbent contamination is not an issue, the absorbing material can be allowed to extend beyond the interfaces 50a, 50b, and 50c. In some situations where high purity fluids pass through the interior of the pipes, it is critical that no absorbent material be allowed to contact the flowing liquids. In such cases, the arrangement shown in FIG. 6 can be used. The ends 14 and 24 of pipes 20 and 30 are butted directly against each other without the use of absorbing material. Absorbing material 44b–44c is then wrapped around the end portions 16 and 26 of pipes 20 and 30 and sleeve 40 placed over the absorbing material 44b–44c to form lap joint configurations with end portions 16 and 26. As shown in FIG. 3 and discussed in detail above, radiation passes through coupling 40 and is absorbed by absorbing material 44b–44c to provide sufficient heat to melt the ends 14 and 24 and end portions 16 and 26 to form the requisite lap and butt joints. It is noted that the melt extends completely to the interior edge of the ends 14 and 24 to fuse and form a smoothly bonded interior surface completely free of absorbing material and any gaps or fissures in which dirt, debris and living organisms might accumulate. Preferably sleeve 40 is provided with material of sufficient clarity to observe visually the fusion and bonding at the lap joint and butt joint interfaces 50a, 50b and 50c.

Figure 7:
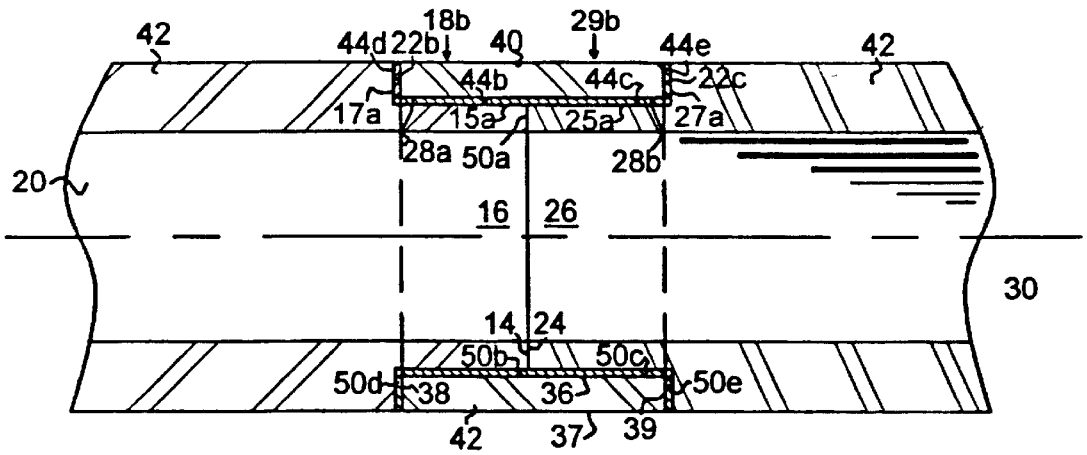
FIG. 7. is a cross-sectional view showing a simultaneous butt and lap joint arrangement for joining two pieces of plastic pipe with an exterior plastic sleeve in which an exterior radial recess is formed in the end portions of the two pieces of pipe to accommodate the plastic sleeve and form a substantially smooth exterior radial surface. Absorbing material is placed between the sleeve and the recessed radial surfaces of the end portions of the pipes and also between the ledges of the pipe recesses and the ends of the sleeve.
Figure 8:
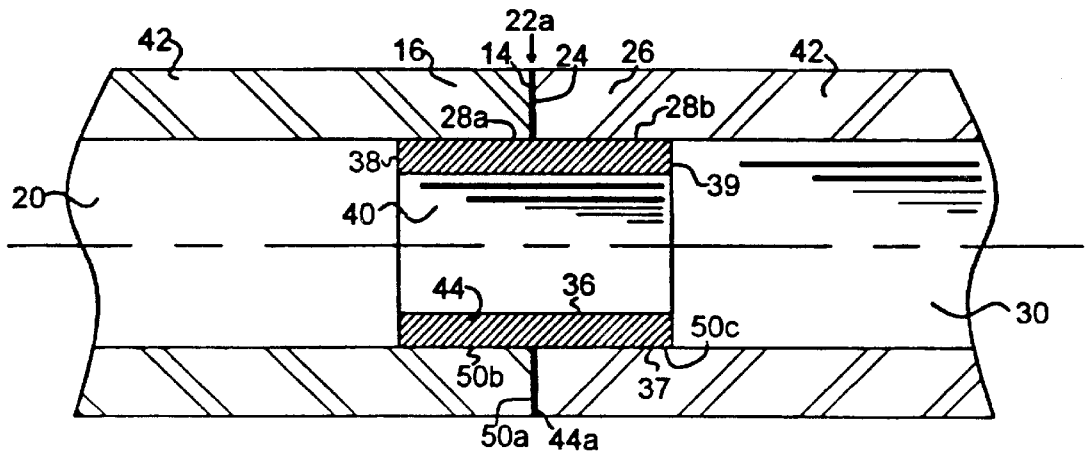
FIG. 8. is a cross-sectional view showing a simultaneous butt and lap joint arrangement for joining two pieces of plastic pipe with an interior plastic sleeve containing absorbing material. Additional absorbing material is placed in the butt joint interface between the ends of the two pipes.
Figure 9:
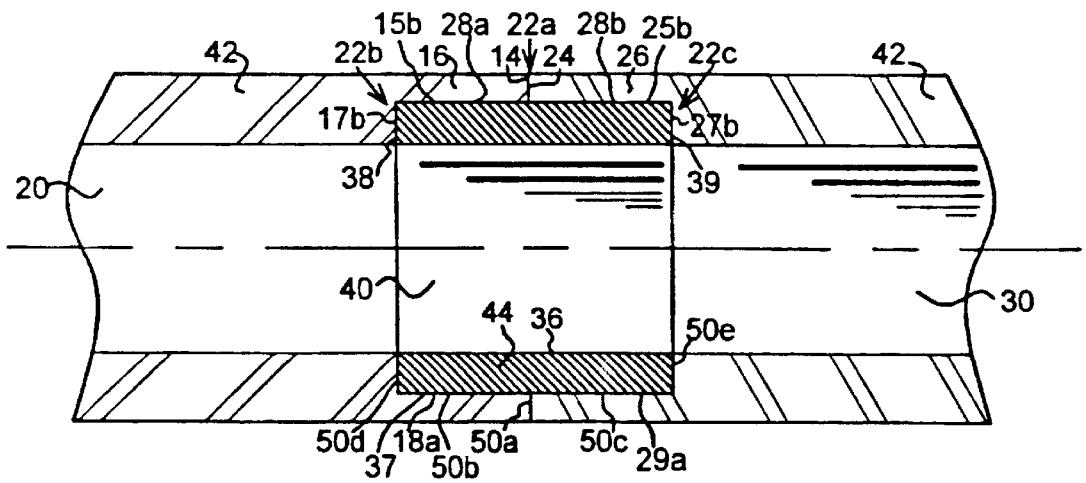
FIG. 9. is a cross-sectional view showing a simultaneous butt and lap joint arrangement for joining two pieces of plastic pipe with an interior plastic sleeve in which an interior radial recess is formed in the end portions of the two pieces of pipe to accommodate the plastic sleeve with integral absorbing material and form a substantially smooth interior pipe radial surface. No additional absorbing material is used with this configuration.

FIGS. 7–9 illustrates other embodiments of the invention using various external and internal sleeve 40 arrangements. In FIG. 7, end portion 16 of plastic pipe 20 is provided with recessed outer circular surface 15a and outer radial ledge 17a to form outer circular recess 18b. The end portion 26 of plastic pipe 30 is also provided with an outer recessed circular surface 25a and outer radial ledge 27a to form outer circular recess 29b. Outer circular recesses 18b and 29b accept plastic coupling 40 in mating relation. End 38 of plastic coupling 40 and outer radial ledge 17a form a fourth interface 50d in butt joint relation 22b. End 39 of plastic coupling 40 and outer radial ledge 27a forming a fifth interface 50e in butt joint relation 22c. Absorbing material 44b, 44c, 44d, and 44e is placed in interfaces 50b, 50c, 50d and 50e, respectively. As noted above, interface 50a is free of absorbing material to avoid any contamination of fluids flowing within the pipes and is heated sufficiently by conductive heating to form a good butt joint between ends 14 and 24. As described previously, electromagnetic radiation is applied to the joint and sufficient heat generated in the interfaces 50a, 50b, 50c, 50d, and 50e to sufficiently melt the ends 14 and 24 and end portions 16 and 26 of pipes 20 and 30 and exterior ledges 17a and 27a and the interior surface 36 and ends 38 and 39 of coupling 40 to fuse and bond ends 14 and 24, end 38 and exterior ledge 17a, and end 39 and exterior ledge 27a in butt joints and end portions 16 and 26 and the interior 36 of coupling 40 in lap joints. Such an assembly provides both exterior and interior pipe surfaces that are smooth as well as an internal bore that is free of any absorbing material contaminants. Such an assembly is especially useful in situations in which the joined pipe must be passed through narrow openings that might otherwise catch the outward extending couplings 40 of FIGS. 4, 5 and 6.

FIG. 8 is another embodiment of the invention in which an internal coupling 40 is used. Rather than placing the coupling on the exterior of the pipes 20 and 30, it is placed in the internal bore of these pipes. As illustrated, interface 50a contains a separate absorbing material 44a. Absorbing material 44 is also incorporated into coupling 40. Lap joints 28a and 28b are formed between the exterior radial surface 37 of coupling 40 and the interior surface of the end portions 16 and 26 of pipes 20 and 30. Butt joint 22a is formed by the ends 14 and 24 of pipes 20 and 30. Radiation passes through the end portions 16 and 26 of pipes 20 and 30 to the absorbing material 44a and absorbing material 44 integral with coupling 40 where sufficient heat is generated to melt the exterior surface portion 36 of coupling 40, the end portions 16 and 26 of pipes 20 and 30, and the ends 14 and 24 of pipes 20 and 30 to fuse and join coupling 40 to the end portions 16 and 26 of pipes 20 and 30 in lap joints 28a and 28b and the ends 14 and 24 of pipes 20 and 30 to each other in a butt joint 22a. One of the features of this design is that the absorbing material can be conveniently incorporated into coupling 40 without further need of providing additional pieces of absorbing material in the bond line. Absorbing material 44a in interface 50a can be eliminated and the butt joint 22a allowed to form through conductive heating of ends 14 and 24. Such an internal coupling does have the disadvantage of partially blocking and creating turbulent flow within the pipe in the region of the coupling.

To overcome this disadvantage and as shown in FIG. 9, internal recesses 18a and 29a are formed in the end portions 16 and 26 of pipes 20 and 30. End portion 16 of plastic pipe 20 is provided with recessed inner circular surface 15b and inner radial ledge 17b to form inner circular recess 18a. The end portion 26 of plastic pipe 30 is also provided with an inner recessed circular surface 25b and inner radial ledge 27b to form inner circular recess 29a. Inner circular recesses 18a and 29a accept plastic coupling 40 in mating relation. End 38 of plastic coupling 40 and inner radial ledge 17b form a fourth interface 50d with butt joint relation 22b. End 39 of plastic coupling 40 and inner radial ledge 27b form a fifth interface 50e in butt joint relation 22c. As shown, no absorbing material is placed in interfaces 50a, 50b, 50c, 50d and 50e. Electromagnetic radiation is applied to the joint and sufficient heat generated in the interfaces 50a, 50b, 50c, 50d, and 50e to sufficiently melt the ends 14 and 24 and end portions 16 and 26 of pipes 20 and 30 and interior ledges 17b and 27b and the exterior surface 37 and ends 38 and 39 of coupling 40 to fuse and bond ends 14 and 24, end 38 and interior ledge 17b, and end 39 and interior ledge 27b in butt joints and end portions 16 and 26 and the exterior 37 of coupling 40 in lap joints. Such an assembly provides both exterior and interior pipe surfaces that are smooth as well as an internal bore that is free of any absorbing material contaminants.

A wide variety of plastic materials can be used with the pipe embodiments of this invention including, but not limited to, polyethylene, polypropylene, and polyvinylidene fluoride (PVDF). For plastics with some absorption of infrared radiation, a filter of a like material can be inserted between the infrared lamp and the joint assembly during the heating process. The absorbing materials are typically black in color and good absorbers of infrared radiation typically containing carbon black, colored pigments or other infrared absorbing material. Black colored inks, paints or black electrical-type tapes can be used as the absorbing material. The pipe itself can be prefabricated with carbon black or other infrared absorbing materials incorporated directly into the end portions of the pipe or into the sleeve surfaces at the requisite locations.

It is possible that changes in configurations to other than those shown could be used but that which is shown is preferred and typical. Without departing from the spirit of this invention, various combinations of electromagnetic radiation, absorbing and transparent materials placed in various positions may be used for this invention.

It is therefore understood that although the present invention has been specifically disclosed with the preferred embodiment and examples, modifications to the design concerning radiation, materials, sizing, shape, and location will be apparent to those skilled in the art and such modifications and variations are considered to be equivalent to and within the scope of the disclosed invention and the appended claims.

We claim:

1. A method for the simultaneous formation of butt joint and lap joints comprising:

a) providing a radiation source of electromagnetic radiation;

b) providing an end of an end portion of a first piece in butt joint relation with an end of an end portion of a second piece;

c) providing a lap joint piece in lap joint relation with:
1) said end portion of said first piece,
2) said end portion of said second piece, and 3) said butt joint relation of said end of said end portion of said first piece and said end of said end portion of said second piece,
d) providing at least one of the group consisting of:
1) said end portion of said first piece,
2) said end portion of said second piece, and
3) said lap joint piece
as a substantially rigid transmitting material that transmits said electromagnetic radiation;
e) providing an absorbing material that absorbs said electromagnetic radiation with generation of heat in at least a portion of a bond line comprising:
1) a first interface between said end of said first piece and said end of said second piece,
2) a second interface between said end portion of said first piece and said lap joint piece, and
3) a third interface between said end portion of said second piece and said lap joint piece
with said quantity of heat sufficient to:
1) bond said end of said first piece to said end of said second piece with a butt joint,
2) bond said end portion of said first piece to said lap joint piece with a lap joint, and
3) bond said end portion of said second piece to said lap joint piece with a lap joint;
f) directing said electromagnetic radiation from said radiation source initially through said transmitting material and then to said absorbing material;
g) absorbing said electromagnetic radiation with said absorbing material to produce sufficient heat in said bond line to provide sufficient molten material to afford fusion of:
1) said end of the first piece,
2) said end of the second piece,
3) said end portion of said first piece,
4) said end portion of said second piece, and
5) said lap joint piece; and
h) cooling said bond line to bond:
1) said end of the first piece with said end of the second piece with said butt joint,
2) said end portion of said first piece with said lap joint piece with said lap joint, and
3) said end portion of said second piece with said lap joint piece with said lap joint.

2. The method for the simultaneous formation of butt and lap joints according to claim 1 wherein said absorbing material is provided as an integral part of at least one component of the following group of components consisting of:
1) said end of the first piece,
2) said end of the second piece,
3) said end portion of said first piece,
4) said end portion of said second piece, and
5) said lap joint piece.

3. The method for the simultaneous formation of butt and lap joints according to claim 1 wherein said absorbing material is provided as a separate component in at least one interface of a group of interfaces consisting of:
1) said first interface between said end of said first piece and said end of said second piece,
2) said second interface between said end portion of said first piece and said lap joint piece, and
3) said third interface between said end portion of said second piece and said lap joint piece.

4. The method for the simultaneous formation of butt and lap joints according to claim 3 further comprising the step of providing a filler material with said absorbing material.

5. The method for the simultaneous formation of butt and lap joints according to claim 4 wherein said absorbing material and said filler material are provided as a thin film of black plastic.

6. The method for the simultaneous formation of butt and lap joints according to claim 1 wherein said electromagnetic radiation is provided as polychromatic, non-coherent electromagnetic radiation.

7. The method for the simultaneous formation of butt and lap joints according to claim 6 wherein said radiation source is provided as a quartz halogen lamp.

8. The method for the simultaneous formation of butt and lap joints according to claim 1 wherein said electromagnetic radiation is provided as monochromatic, coherent electromagnetic radiation.

9. The method for the simultaneous formation of butt and lap joints according to claim 8 wherein said radiation source is a laser.

10. The method for the simultaneous formation of butt and lap joints according to claim 1 further comprising applying pressure to said end of said first piece and said end of said second piece.

11. The method for the simultaneous formation of butt and lap joints according to claim 1 wherein said substantially rigid transmitting material is provided with sufficient clarity to visually observe at least partially fusion of:
1) said end of the first piece,
2) said end of the second piece,
3) said end portion of said first piece,
4) said end portion of said second piece, and
5) said lap joint piece.

12. The method for the simultaneous formation of butt and lap joints according to claim 1 wherein said first piece is provided as a first plastic pipe, said second piece is provided as a second plastic pipe, and said lap joint piece is provided as a plastic coupling.

13. The method for the simultaneous formation of butt and lap joints according to claim 12 wherein said plastic coupling is provided external to said end portion of said first plastic pipe and said end portion of said second plastic pipe.

14. The method for the simultaneous formation of butt and lap joints according to claim 13 wherein said absorbing material is provided as an integral part of at least one end portion of the group of end portions consisting of said end portion of said first plastic pipe and said end portion of said second plastic pipe.

15. The method for the simultaneous formation of butt and lap joints according to claim 13 wherein said absorbing material is provided as a separate component.

16. The method for the simultaneous formation of butt and lap joints according to claim 15 wherein
1) said absorbing material is provided as a single component in said second interface between said end portion of said first plastic pipe and said plastic coupling and said third interface between said end portion of said second plastic pipe and said plastic coupling; and
2) said plastic coupling is provided as said substantially rigid transmitting plastic material.

17. The method for the simultaneous formation of butt and lap joints according to claim 16 wherein:
1) said absorbing material is provided as a first portion in said second interface between said end portion of said first plastic pipe and said plastic coupling and a second portion in said third interface between said end portion of said second plastic pipe.

18. The method for the simultaneous formation of butt and lap joints according to claim 17 wherein said absorbing material is further provided as a third portion in said first interface between said end of said first plastic pipe and said end of said second plastic pipe.

19. The method for the simultaneous formation of butt and lap joints according to claim 18 wherein said absorbing material is further provided with a filler material.

20. The method for the simultaneous formation of butt and lap joints according to claim 19 wherein said absorbing material and said filler material are provided as a thin film of black plastic.

21. The method for the simultaneous formation of butt and lap joints according to claim 12 wherein said substantially rigid transmitting plastic material is provided with sufficient optical clarity to visually observe at least partially fusion of:

1) said end of the first plastic pipe,
2) said end of the second plastic pipe,
3) said end portion of said first plastic pipe,
4) said end portion of said second plastic pipe, and
5) said plastic coupling.

22. The method for the simultaneous formation of butt and lap joints according to claim 12 further comprising the step of rotating said first plastic pipe, said second plastic pipe, and said coupling to direct said electromagnetic radiation to said absorbing material.

23. The method for the simultaneous formation of butt and lap joints according to claim 12 further comprising the step of rotating said radiation source about said first plastic pipe, said second plastic pipe, and said coupling to direct said electromagnetic radiation to said absorbing material.

24. The method for the simultaneous formation of butt and lap joints according to claim 12 further comprising the step of providing said radiation source as a circular source to direct said electromagnetic radiation to said absorbing material bond line.

25. The method for the simultaneous formation of butt and lap joints according to claim 12 wherein said coupling is provided as an exterior coupling.

26. The method for the simultaneous formation of butt and lap joints according to claim 12 wherein said coupling is provided as an interior coupling.

27. The method for the simultaneous formation of butt and lap joints according to claim 12 wherein:

1) said first end portion of said first plastic pipe is provided with a first recessed circular surface and a first radial ledge to form a first circular recess;

2) said second end portion of said second plastic pipe is provided with a second recessed circular surface and a second radial ledge to form a second circular recess; and 3) said first circular recess and said second circular recess accepting said plastic coupling in mating relation with
   a) a first end of said plastic coupling and said first radial ledge forming a fourth interface in butt joint relation; and
   b) a second end of said plastic coupling and said second radial ledge forming a fifth interface in butt joint relation.

28. The method for the simultaneous formation of butt and lap joints according to claim 27 wherein:

1) said first circular recess is an outer recess;
2) said second circular recess is an outer recess; and
3) said plastic coupling is an exterior coupling.

29. The method for the simultaneous formation of butt and lap joints according to claim 28 further comprising the step of providing absorbing material in said second interface, said third interface, said fourth interface, and said fifth interface.

30. The method for the simultaneous formation of butt and lap joints according to claim 27 wherein:

1) said first circular recess is an inner recess;
2) said second circular recess is an inner recess; and
3) said plastic coupling is an interior coupling.

31. The method for the simultaneous formation of butt and lap joints according to claim 30 further comprising the step of providing absorbing material as a part of said interior coupling.

32. A manufacture comprising a simultaneously formed butt joint and lap joints according to the method of claim 1.

33. A manufacture comprising a simultaneously formed butt joint and lap joints according to the method of claim 12.

* * * * *